United States Patent [19]

Taylor et al.

[11] 4,023,689

[45] May 17, 1977

[54] CONVEYOR-TYPE, HYDRAULIC-POWERED, MATERIAL-SPREADING APPARATUS

[75] Inventors: Bruce W. Taylor, Mechanicville; Gregory J. Murray, Saratoga Springs, both of N.Y.

[73] Assignee: Tarrant Manufacturing Company, Saratoga Springs, N.Y.

[22] Filed: Nov. 21, 1975

[21] Appl. No.: 634,032

[52] U.S. Cl. .......................... 214/17 D; 74/100 R; 91/413; 188/1 C; 198/834; 251/75
[51] Int. Cl.² ...................................... B65G 23/06
[58] Field of Search ................... 214/17 D, 83.36; 198/203, 832, 834, 835; 91/413; 60/483

[56] References Cited
UNITED STATES PATENTS

| | | | |
|---|---|---|---|
| 2,402,056 | 6/1946 | King | 198/203 |
| 2,674,853 | 4/1954 | Born | 198/203 X |
| 3,482,717 | 12/1969 | Moser | 214/83.36 |

*Primary Examiner*—Robert G. Sheridan
*Attorney, Agent, or Firm*—Walter F. Wessendorf, Jr.

[57] ABSTRACT

Discloses a conveyor-type, hydraulic-powered, material-spreading apparatus comprising a material-storage hopper, a conveyor for conveying material from the hopper for spreading same and a hydraulic, power-transfer system comprising two double-acting, hydraulic cylinders in communication with and operatively connected to valves which control and direct hydraulic fluid under pressure to the hydraulic cylinders to drive the conveyor. Each hydraulic cylinder has two drive strokes per cycle, with each drive stroke approximating 160°, each hydraulic cylinder is 90° out of phase with the other, with positive drive resulting throughout the cycle.

Also discloses the hydraulic, power-transfer system described above for use in driving a conveyor for use with a material-spreading apparatus having a source of material to be spread, with such conveyor being disposed beneath the material for conveying same for spreading.

Also discloses a shock-absorbing device and limit stop for use with a member having a reciprocable element therein. Resilient bumper rings function as shock absorbers and limit stops upon abutment therewith of an end plate carried by the reciprocable element.

Also discloses a snap-action device for operative use with a reciprocable element in a member and with a reciprocating rod to reciprocate and slam the reciprocable element in the direction opposite to that being traveled by the reciprocating rod.

18 Claims, 8 Drawing Figures

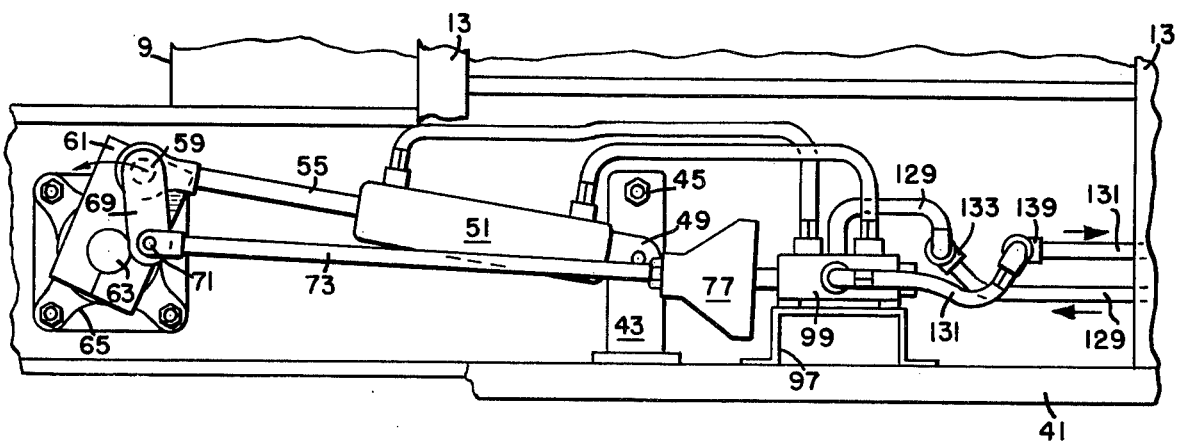
FIG. 4.
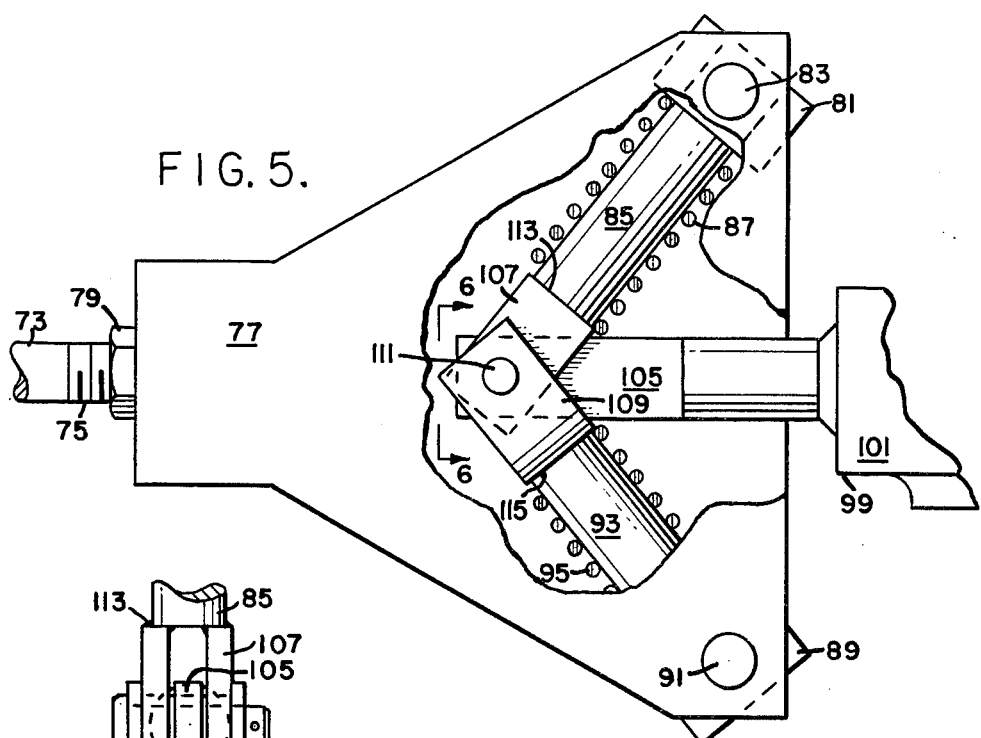
FIG. 5.
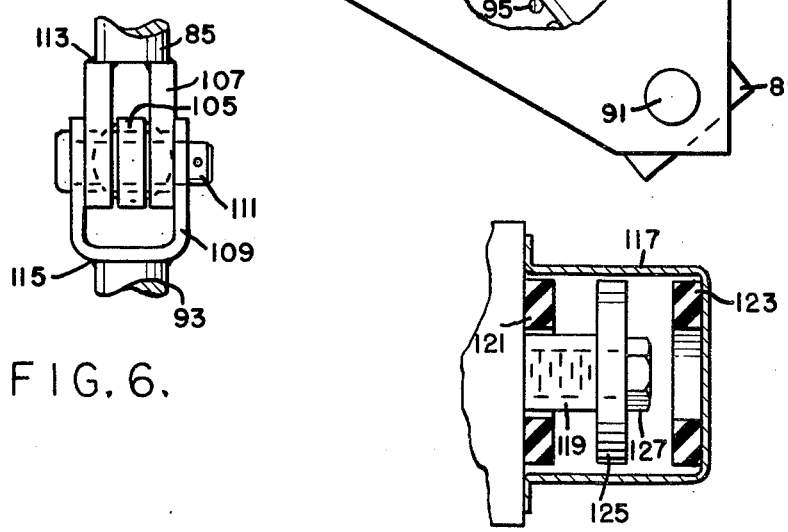
FIG. 6.
FIG. 7.

CONVEYOR-TYPE, HYDRAULIC-POWERED, MATERIAL-SPREADING APPARATUS

This invention relates to the art of material-spreading apparatus wherein and whereby a container such as a vehicle-mounted hopper is employed for non-fluid material, and scattering means is employed to scatter the material. In particular, the invention relates to materials such as salt, sand, cinders, and the like, to be scattered and spread on roads and highways, or such materials for agricultural applications such as fertilizers, and the like. The hopper is filled with the material which is conveyed by a power-driven conveyor to a power-driven spinner which scatters and spreads such material.

The present technology in the art employs a hydraulic motor which drives an intermediate power-transfer system such as a worm-gear drive which in turn drives the conveyor drive shaft. Other examples of the intermediate, mechanical power-transfer systems employed are sprockets and chains, or the combination of worm-gear and worm-type, unitized speed reducers. Such intermediate, mechanical power-transfer systems have inherent power losses and achieve an overall machine efficiency in the 60% to 62% range.

An object of the invention is to contribute to the solution of this discussed problem of the art by providing a new, useful and advantageous hydraulic, power-transfer system which not only replaces the hydraulic motor and its associated intermediate, mechanical power-transfer system, but also achieves an overall efficiency of 95%. The hydraulic, power-transfer system of this invention employs two double-acting, hydraulic cylinders with one of the hydraulic cylinders being 90° out of phase with the other.

The amount of salt scattered and spread on roads and highways in the wintertime has engendered ecological concerns for the effects on the environment with the result that today minimal amounts of salt and other chemicals are being scattered and spread on roads and highways in the wintertime. Moreover, without regard to ecological concerns, minimal amounts of sand and salt applied to roads and highways in the wintertime produce the beneficial effect of substantial costs savings. Possible ways and means employable to apply minimal amounts of salt or other chemicals are: to close as far as possible the discharge gate beneath which the conveyor conveys the salt from the hopper to the spinner for scattering and spreading; to slow down the conveyor speed while maintaining the same vehicle speed and the same discharge opening beneath the discharge gate; or to drive the vehicle at a fast rate of speed while maintaining the same conveyor speed and the same material flow rate beneath the discharge gate.

A hopper filled with material compacts, especially after the hopper is filled and then the vehicle mounting such hopper is driven. Therefore, to "break-away" such compacted load of material in the hopper, a torque output of about twice the operating torque is required for the conveyor bar flights to "break-away" such compacted load of material in the hopper. The problem is that prior-art, hydraulic motors at start up have poor lubrication and a tendency to stick; therefore, because of this described problem, the hydraulic motors to be utilized must be sized large just to "start" the load. The hydraulic, power-transfer system of the invention, employing double-acting, hydraulic-cylinder drive to drive the conveyor, contributes to the solution of this discussed problem of the prior art for the reason that the two double-acting, hydraulic cylinders are 90° out of phase with each other, for the reason that each hydraulic-cylinder piston has two drive strokes per cycle with each drive stroke occupying approximately 160° with the result that positive drive throughout the cycle results, and for the reason that thereby high-torque output is maintained throughout the speed range, from slow speed to high speed, with maximum torque output at close to zero RPM.

Conditions where the vehicles must be driven at a slow rate of speed occur such as when the vehicles are employed for salting and/or sanding while going through a city or highly traffic-congested area and when the vehicles are employed both for plowing and salting and/or sanding at the same time. Under these slow-vehicle speed conditions, the hydraulic motors operate below their warranted speed of approximately 400 RPM with resulting damage or eventual damage, malfunction and breakdown of such hydraulic motors. The described hydraulic, power-transfer system of this invention contributes to the solution of this discussed problem of the prior art for the previously delineated reason that high-torque output is maintained through the slow to high speed range with maximum torque output at close to zero RPM.

With the described hydraulic, power-transfer system of this invention and with a minimum maintainable speed of close to zero RPM, an infinite speed adjustment is possible. The discharge gate can be left in a partially open position approximating 3 inches. All spreading speeds and amounts can be applied. Vehicle-operator comfort and safety result because the operator does not have to stop his vehicle to adjust the position of the discharge gate as road and storm conditions change. Discharge-gate damage is minimized, hydraulic pressure is lowered and salt crystals scattered and spread remain intact and uncrushed for maximum deicing effectiveness on the highway.

When the material-spreading apparatus is utilized for seal-blotting and shoulder-fill operations, the conveyor is driven at high speed. And because hydraulic motors must be sized large to overcome start loads, high fluid flows are required for high conveyor speed. Since high-speed operation of the conveyor requires high fluid flows, hydraulic pump size and reduction for practical application limit high-speed capacity. This invention, employing the double-acting, hydraulic-cylinder drive to drive the conveyor, likewise contributes to the solution of this discussed problem of the prior art because less hydraulic fluid is required for such hydraulic-cylinder drive to drive the conveyor at any given speed with the result that higher output speeds than conventional machines can be achieved without the use of different gearing or without the use of larger hydraulic pumps. The reason for this is that less hydraulic fluid flow in gallons per minute is required for the hydraulic cylinders of this invention than for hydraulic motors because the hydraulic cylinders employed in this invention displace approximately 35% less hydraulic fluid than is displaced by the hydraulic motors conventionally employed. With comparable hydraulic fluid flow from the hydraulic pump, the hydraulic cylinders of this invention can effect approximately 50% greater speed of the conveyor than the prior-art, hydraulic-motor effected conveyor speed.

The hydraulic, power-transfer system employed in this invention contributes to the art in substantial savings realized in the operation of the material-spreading apparatus. In average, comparable operation, a conventional material-spreading apparatus will require 15 engine horsepower or approximately 7.5 pounds of fuel per hour. In comparison thereto, the hydraulic, power-transfer system employed in this invention under the same operating conditions will require only 10.5 engine horsepower or approximately 5.25 pounds of fuel per hour for a net savings of 2.25 pounds of fuel per hour or 0.4 gallon of fuel per hour.

It should be discerned and appreciated from the discussion of the problems of the prior art and the contributions of this invention towards solving such discussed prior-art problems, and the contributions of this invention to the spreader art, that the high overall efficiency achieved by the described hydraulic, power-transfer system of this invention permits hydraulic-pump requirements to be reduced, thereby drastically reducing first cost to the user. It should be discerned and appreciated further, for reason of the advantageous operating characteristics of the described hydraulic, power-transfer system employed, that such system is suitable for a material-spreading apparatus with attendant versatility for spreader use, and with less maintenance and adjustments required for such spreader use.

Accordingly, these objects and other objects of the invention should be discerned and appreciated by reference to the detailed specification taken in conjunction with the drawings, wherein like reference numerals refer to similar parts throughout the several views, in which:

FIG. 4 is a view of the hydraulic-cylinder drive of the invention at the right sidewall of the hopper as viewed from the rear of the hopper;

FIG. 5 is a view of the snap-action device;

FIG. 6 is a view taken in the direction of arrows 6—6 in FIG. 5;

FIG. 7 is a view of the shock absorber and limit stop for the valve spool of the valve utilized in the invention.

Figure 1:
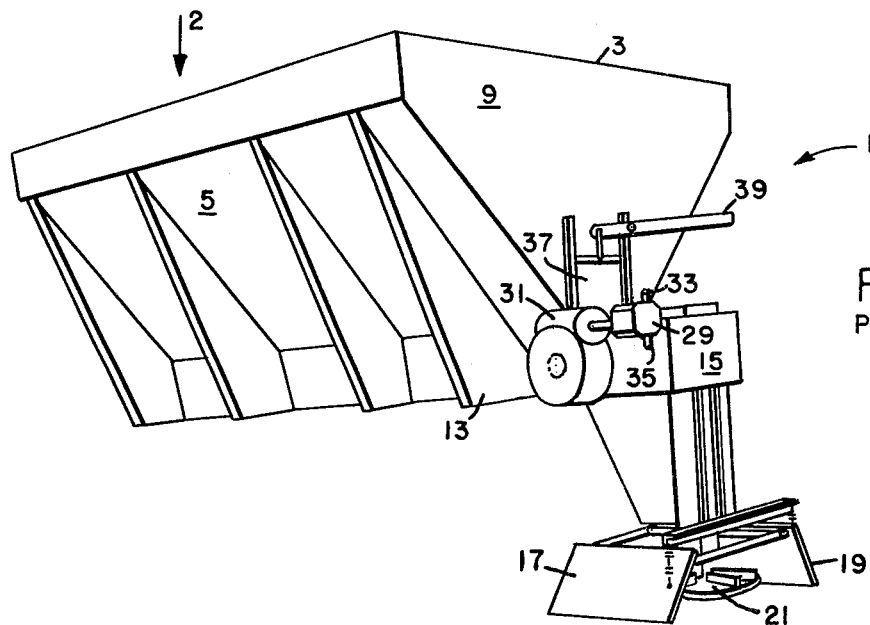
FIG. 1 is a perspective view of the material-spreading apparatus of the prior art.
Figure 2:
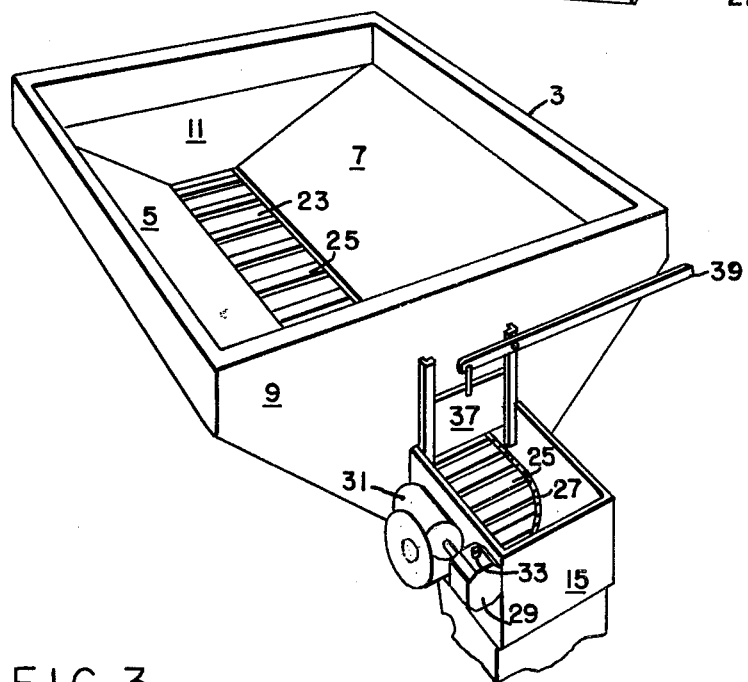
FIG. 2 is a perspective view taken in the direction of arrow "2" in FIG. 1.

To facilitate the understanding of the invention, a nomenclature list is herewith provided:

1 — generally refers to the prior-art, material-spreading apparatus
3 — hopper
5 — left sidewall of hopper 3
7 — right sidewall of hopper 3
9 — rear wall of hopper 3
11 — front wall of hopper 3
13 — gusset
15 — materials chute
17 — material deflector
19 — material deflector
21 — power-driven spinner
23 — conveyor
25 — bar flight of conveyor 23
27 — chain of conveyor 23
29 — hydraulic motor
31 — worm-gear drive
33 — hydraulic line
35 — hydraulic line
37 — discharge gate on rear wall 9
39 — hand lever for discharge gate 37
41 — channel iron
43 — bracket
45 — indication of bolting
47 — transverse pivot mount
49 — cylinder bracket
51 — double-acting, hydraulic cylinder
53 — piston
55 — piston rod of piston 53
57 — piston-rod end of piston rod 55
59 — stub shaft
61 — crank
63 — drive shaft for conveyor drive sprocket
65 — flange housing
67 — bolt for flange housing 65
69 — valve-rod crank
71 — transverse pivot pin fixed to valve-rod crank 69
73 — valve rod
75 — threaded end of valve rod 73
77 — snap-action, bifurcated mounting plate
79 — lock nut on threaded end 75
81 — spring-mount guide
83 — transverse pin carried by guide 81
85 — spring mount
87 — compression spring on spring mount 85
89 — spring-mount guide
91 — transverse pin carried by guide 89
93 — spring mount
95 — compression spring on spring mount 93
97 — valve-mounting bracket
99 — four-way valve
101 — valve housing of four-way valve 99
103 — valve spool of four-way valve 99
105 — reduced end portion of valve spool 103
107 — clevis of spring mount 85
109 — clevis of spring mount 93
111 — cross pin
113 — shoulder portion of clevis 107
115 — shoulder portion of clevis 109
117 — shock-absorbing housing
119 — other end of valve spool 103
121 — rubber-bumper ring carried by other end 119
123 — rubber-bumper ring carried on housing 117
125 — bumper plate carried on end 119
127 — cap screw
129 — high-pressure hydraulic line
131 — low-pressure hydraulic line
133 — Tee of line 129
135 — elbow of line 129
137 — valve-inlet port of valve housing 101
139 — Tee of line 131
141 — elbow of line 131
143 — valve-outlet port of valve housing 101
145 — hydraulic line communicating between ports 147 and 149
147 — valve-cylinder port of valve housing 101
149 — cylinder port of cylinder 51
151 — hydraulic line communicating between ports 153 and 155
153 — valve-cylinder port of valve housing 101
155 — cylinder port of cylinder 51

In FIG. 1 of the drawings, reference numeral 1 generally refers to a material-spreading apparatus of the prior art. Such apparatus 1 comprises a hopper 3, as shown, having, as directionally viewed from the rear of hopper 3, left and right sidewalls 5 and 7, rear wall 9, front wall 11 and gussets 13 to strengthen the hopper sidewalls 5 and 7.

Hopper 3 is appropriately disposed within the dump body of a dump truck or mounted on the chassis of a truck.

Fixed to and depending from the rear wall 9 of hopper 3 is a materials chute 15 at the end of which are material deflectors 17 and 19, and a power-driven spinner 21, all as shown. Disposed at the bottom of hopper 3 is a conventional conveyor 23 having bar flights 25 carried by chains 27 trained around a set of drive sprockets (not shown) in the rear and a set of idler sprockets (not shown) in the front. A hydraulic motor 29 and worm-gear drive 31 are mounted, as shown. Hydraulic motor 29 is operatively connected to worm-gear 31 and worm-gear drive 31 is operatively connected to the drive sprockets to drive conveyor 23.

A conventional hydraulic pump (not shown) driven by the truck's engine, its power-take-off or some independent power source pumps hydraulic fluid under pressure to hydraulic motor 29 with communication between the hydraulic pump and hydraulic motor 29 established by conventional hydraulic lines 33 and 35. Appropriate conventional hydraulic controls (not shown) are interposed in the hydraulic system to effect and control drive of the conveyor 23 in one direction or the reverse direction and to control the speed of conveyor 23.

For operation of the apparatus 1, hopper 3 is appropriately filled with materials such as salt, sand cinders, and the like, to be spread on roads and highways, or such materials for agricultural applications such as fertilizers, and the like. A discharge gate 37, mounted over an exit opening in the real wall 9 of hopper 3, as shown, is adjustably raised or lowered by a hand lever 39 disposed and operatively connected to discharge gate 37, as shown. The amount of material scattered and spread by spinner 21 depends upon the amount of material dispensed by conveyor 23 from the hopper 3 to the materials chute 15 with such dispensed amount being controlled by the position of the discharge gate 37 relative to its associated exit opening in the rear wall 9 of hopper 3 and the operating speed of conveyor 23.

Figure 3:
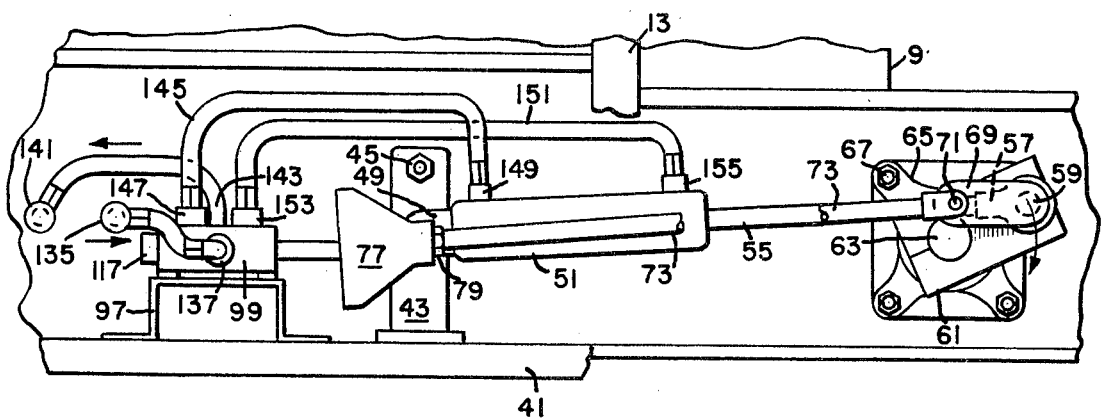
FIG. 3 is a view of the hydraulic-cylinder drive of the invention at the left sidewall of the hopper as viewed from the rear of the hopper.

In FIGS. 3 and 4 of the drawings are shown the interrelated, hydraulic-cylinder drive of this invention mounted on the left and right sidewalls 5 and 7, respectively, to drive conveyor 23, and which hydraulic-cylinder drive replaces hydraulic motor 29 and worm-gear drive 31.

Channel irons 41 are suitably fixed between the two rearward gussets 13 on the left sidewalls 5 and right sidewall 7, as shown. Fixed to and upstanding from channel iron 41 is a bracket 43 bolted to left sidewall 5, as indicated at 45 and shown. A transverse pivot mount 47 pivotally mounts cylinder bracket 49 fixed to double-acting, hydraulic cylinder 51. Piston 53, disposed and reciprocable within cylinder 51, is connected to piston rod 55 whose piston-rod end 57 has a bearing mounted on the stub-shaft journal of stub shaft 59 fixed to a crank 61 which is fixed to the drive shaft 63 for the conveyor drive sprocket. Flange housing 65, as shown, is fixed by bolts to the support structure and has therein a bearing mounting drive shaft 63.

Valve-rod crank 69, fixed to stub shaft 59, has a transversely disposed pivot pin 71 pivotally mounting valve rod 73 whose threaded end 75 is engaged in a tapped hole (not shown) formed in the snap-action, bifurcated mounting plate 77. Accordingly, the operative length of valve rod 73 may be adjusted relative to mounting plate 77 by inward or outward movement, as required, of the threaded end 75 of valve rod 73 relative to the tapped hole in mounting plate 77, and with such resulting adjustment of the length of valve rod 73 fixed by thereafter appropriately engaging lock nut 79 on the threaded end 75 against mounting plate 77.

A spring-mount guide 81, having two transverse pins 83 fixed thereto, is thereby trunnion-mounted by such pins 83 being pivotally disposed through aligned holes formed in bifurcated mounting plate 77. Spring-mount guide 83 reciprocally receives freely therein a spring mount 85 which carries and mounts thereon a compression spring 87.

A spring-mount guide 89, having two transverse pins 91 fixed thereto, is thereby trunnion-mounted by such pins 91 being pivotally disposed through aligned holes formed in bifurcated mounting plate 77. Spring-mount guide 89 reciprocally receives freely therein a spring mount 93 which carries and mounts thereon a compression spring 95.

Fixed to and upstanding from channel iron 41 is a valve-mounting bracket 97 that mounts a four-way valve 99 whose valve housing 101 reciprocally receives therein a valve spool 103. Valve spool 103 extends beyond valve housing 101 and has a reduced-end portion 105 that is received within clevis 107 fixed to spring mount 85, and, in turn, clevis 107 is received within clevis 109 fixed to spring mount 93. A cross pin 111, disposed through aligned holes formed in reduced-end portion 105, clevis 107 of spring mount 85 and clevis 109 of spring mount 93, affords pivotal-mounting relationship thereby.

As shown, the compression springs 87 and 95, mounted and carried on their respective spring mounts 85 and 93, are constrained by and between their respective spring-mount guides 81 and 89, and by the respective shoulder portions 113 and 115 of their respective clevises 107 and 109.

As viewed more discernably in FIG. 5, as valve rod moves to its left and carries bifurcated mounting plate 77 to its left, springs 87 and 95 will be compressed between their respective spring-mount guides 81 and 89, and by their respective shoulder portions 113 and 115 of their respective clevises 107 and 109. At the position of maximum compression of springs 87 and 95 represented by an imaginary line passing through the centers of pins 83, 111 and 91, and slightly beyond that position, reacting restoring vector forces from springs 87 and 95 provide the drive means to reciprocate and slam valve spool 103 to the right in FIG. 3 to occupy a position in the valve housing, that is shown in the bottom portion of FIG. 8, which would be with the valve spool to the extreme left of the position of valve spool 103 shown in the bottom portion of FIG. 8.

Shown in FIG. 7 is a shock-absorbing housing 117 fixed to valve housing 101. The other end 119 of valve spool 103 extends into housing 117 and carries a rubber-bumper ring 121. A similar rubber-bumper ring 123 is carried on housing 117. Bumper plate 125 is carried on the end 119 of valve spool 103 by a cap screw 127 disposed through a hole formed in bumper plate 125 and engaged in a tapped hole formed in the end 119 of valve spool 103. It should be appreciated that in the reciprocation of valve spools 103 in the rubber-bumper rings 121 and 123 function both as shock absorbers and limit stops upon the abutment of bumper or end plate 125 with rings 121 and 123.

It should be appreciated that the hydraulic-cylinder drive shown and described in FIG. 3 of the drawings is the same as the hydraulic-cylinder drive shown in FIG. 4. The difference is the fact that piston 53 in hydraulic cylinder 51 in FIG. 3 is 90° out of phase with the piston of the hydraulic cylinder shown in FIG. 4.

Shown in FIG. 4 are the high-pressure, hydraulic line 129 from the hydraulic pump and the low-pressure, hydraulic line 131 that returns to a reservoir and thence to the hydraulic pump. High-pressure line 129 communicates with a Tee 133 whose branch communicates in FIG. 3 with an elbow 135 providing communication for the high-pressure line communicating with valve-inlet port 137. Low-pressure, hydraulic line 131 communicates with a Tee 139 whose branch communicates in FIG. 3 with an elbow 141 providing communication for the low-pressure line communicating with valve-outlet port 143. Hydraulic line 145 establishes communication between valve-cylinder port 147 and cylinder port 149, and hydraulic line 151 establishes communication between valve-cylinder port 153 and cylinder port 155.

Figure 8:
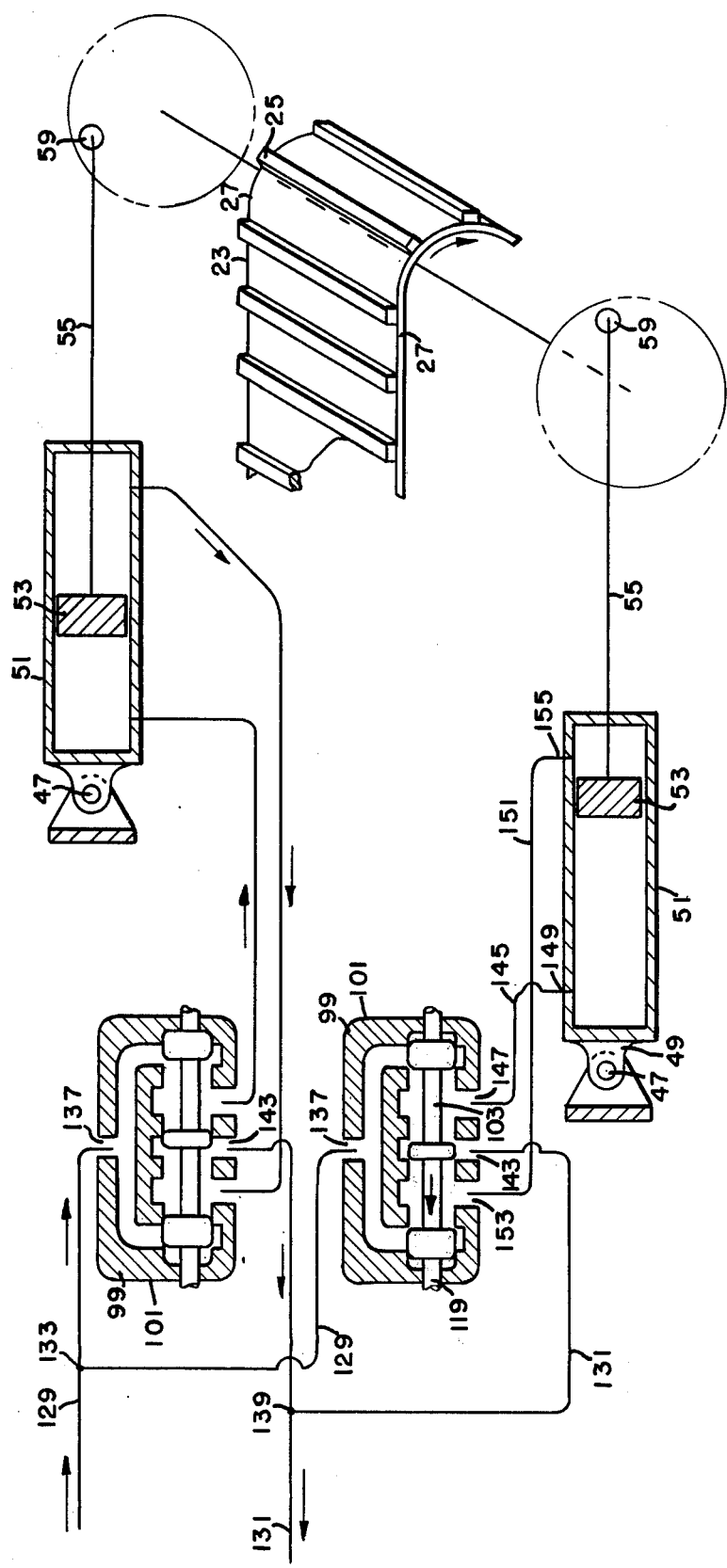
FIG. 8 is a schematic view of the invention showing the hydraulic cylinders and their respective pistons 90° out of phase with each other with drive imparted to the conveyor, and showing the respective valves associated with such hydraulic cylinders.

In FIG. 8, the four-way valve and hydraulic cylinder (top cylinder) shown on the top portion of the sheet represent the four-way valve and hydraulic cylinder shown in FIG. 4; and the four-way valve and hydraulic cylinder (bottom cylinder) shown on the bottom portion of the sheet represent the four-way valve and hydraulic cylinder shown in FIG. 3. The arrow on the valve spool shown on the bottom portion of the sheet in FIG. 8 indicates the direction in which such valve spool is moving. The top cylinder is shown with its piston roughly halfway through its drive stroke with the position of its associated valve spool corresponding thereto. The bottom cylinder is shown with its piston roughly at top dead center of its push drive stroke with the position of its associated valve spool corresponding thereto and being in the course of snap action.

Since double-acting, hydraulic cylinders are employed, drive can be imparted by push or pull of the piston: push when a cylinder and its piston rod extend, and pull when a cylinder and its piston rod contract. Each hydraulic-cylinder piston has two drive strokes per cycle with each drive stoke occupying approximately 160°. And since the hydraulic cylinders are 90° out of phase with each other, positive drive throughout the cycle thereby results. As shown, during the cycle each valve-cylinder port alternates to drive the cylinder piston in one direction of push and then after 180° in the opposite direction of pull.

When the springs 87 and 95 line up by an imaginary line passing through the centers of pins 83, 111 and 91, the corresponding positions of the pistons in their cylinders are 10° before top dead center in the one and bottom dead center in the other. Snap action of the springs 87 and 95 theoretically should occur at top dead center or at bottom dead center. However, snap action occurs within the range of 5° before or after top dead center and similarly within the range of bottom dead center.

Having thusly described our invention, we claim:

1. A conveyor-type, hydraulic-powered, material-spreading apparatus comprising: a material-storage hopper, a conveyor for conveying said material from said hopper for spreading same, two hydraulic cylinders and spool valve means, said hydraulic cylinders being double-acting, said hydraulic cylinders being 90° out of phase with each other, each of said hydraulic cylinders having a piston, and wherein and whereby drive is imparted by push or pull of said pistons, said hydraulic cylinders communicating with said valve means, means operatively connecting said hydraulic cylinders and valve means to actuate said valve means, said valve means controlling and directing a source of hydraulic fluid under pressure to said hydraulic cylinders to drive same and means operatively connecting said hydraulic cylinders with said conveyor to drive same.

2. A material-spreading apparatus in accordance with claim 1, wherein each hydraulic cylinder has two drive strokes per cycle with each drive stroke occupying approximately 160°, with positive drive throughout the cycle thereby resulting.

3. A material-spreading apparatus in accordance with claim 1, wherein each of said hydraulic cylinders has a piston rod, wherein said means operatively connecting said hydraulic cylinders with said conveyor to drive same comprise two stub shafts, two cranks and a conveyor drive shaft, wherein said stub shafts freely carry said piston rods, wherein said cranks fixedly carry said stub shafts and conveyor drive shaft.

4. A material-spreading apparatus in accordance with claim 1, wherein said valve means comprise two four-way valves each comprising a valve housing and reciprocable valve spool therein.

5. A material-spreading apparatus in accordance with claim 1, wherein said valve means comprise two valves each comprising a valve housing and reciprocable valve spool therein, wherein each of said valve housings carries a shock-absorbing housing, wherein one end of said valve spool extends into said shock-absorbing housing and carries resilient means, wherein said shock-absorbing housing carries another resilient means, wherein said valve-spool extension carries an end plate, and wherein in the reciprocation of said valve spool said resilient means function as shock absorbers and limit stops upon abutment of said end plate with said resilient means.

6. A material-spreading apparatus in accordance with claim 1, wherein said valve means comprise two valves each comprising a valve housing and reciprocable valve spool therein, wherein each of said hydraulic cylinders has a piston rod, wherein said means operatively connecting said hydraulic cylinders and valve means to actuate said valve means comprise two stub shafts, two valve-rod cranks, two transverse pivot pins, two valve rods and two snap-action devices, wherein said stub shafts freely carry said piston rods, wherein said stub shafts fixedly carry said valve-rod cranks, wherein said valve-rod cranks fixedly carry said transverse pivot pins, wherein said transverse pivot pins freely carry said valve rods and wherein said valve rods and valve spools carry therebetween said snap-action devices.

7. A material-spreading apparatus in accordance with claim 1, wherein said valve means comprise two valves each comprising a valve housing and reciprocable valve spool therein, wherein said means operatively connecting said hydraulic cylinders and valve means to actuate said valve means comprise two valve rods and two snap-action devices, wherein each valve rod and each valve spool operatively carry therebetween one of said snap-action devices, and wherein said snap-action device has means to reciprocate and slam said valve spool in a direction of travel opposite to the direction of travel of said valve rod connected to said snap-action device.

8. A material-spreading apparatus in accordance with claim 7, wherein each valve spool has a reduced-end portion extending beyond its valve housing, wherein each snap-action device comprises a bifurcated mounting plate, two spring-mount guides each having two transverse pins fixed thereto, two spring mounts, two springs, two clevises and a cross pin, wherein said mounting plate has aligned holes pivotally receiving said transverse pins for trunnion-mounting of said spring-mount guides, wherein said spring-mount guides freely receive said spring mounts, wherein said spring mounts carry said springs, wherein said spring mounts fixedly carry said clevises, and wherein said clevises and reduced end portion of said valve spool have aligned holes freely receiving said cross pin to afford pivotal mounting relationship thereby.

9. A material-spreading apparatus in accordance with claim 1, wherein each of said hydraulic cylinders has a piston rod, wherein each hydraulic cylinder has two drive strokes per cycle with each drive stroke occupying approximately 160°; wherein said means operatively connecting said hydraulic cylinders with said conveyor to drive same comprise two stub shafts, two cranks and a conveyor drive shaft, wherein said stub shafts freely carry said piston rods, wherein said cranks fixedly carry said stub shafts and conveyor drive shaft; wherein said valve means comprise two four-way valves each comprising a valve housing and a reciprocable valve spool therein, wherein each of said valve housings carries a shock-absorbing housing, wherein one end of said valve spool extends into said shock-absorbing housing and carries resilient means, wherein said shock-absorbing housing carries another resilient means, wherein said valve-spool extension carries an end plate, and wherein in the reciprocation of said valve spool said resilient means function as shock absorbers and limit stops upon abutment of said end plate with said resilient means; wherein said means operatively connecting said hydraulic cylinders and valve means to actuate said valve means comprise two valve-rod cranks, two transverse pivot pins, two valve rods and two snap-action devices, wherein said stub shafts fixedly carry said valve-rod cranks, wherein said valve-rod cranks fixedly carry said transverse pivot pins, wherein said transverse pivot pins freely carry said valve rods, wherein each of said valve rods and each of said valve spools operatively carry therebetween one of said snap-action devices, and wherein each of said snap-action devices has means to reciprocate and slam said valve spool in a direction of travel opposite to the direction of travel of said valve rod connected to said snap-action device; and wherein each valve spool has a reduced-end portion extending beyond its valve housing, wherein said means of said snap-action device to reciprocate and slam said valve spool in a direction of travel of said valve rod connected to said snap-action device comprises a bifurcated mounting plate, two spring-mount guides each having two transverse pins fixed thereto, two spring mounts, two springs, two clevises and a cross pin, wherein said mounting plate has aligned holes pivotally receiving said transverse pins of said spring-mount guides for trunnion-mounting of said spring-mount guides, wherein said spring-mount guides freely receive said spring mounts, wherein said spring mounts carry said springs, wherein said spring mounts fixedly carry said clevises, and wherein said clevises and reduced-end portion of said valve spool have aligned holes freely receiving said cross pin to afford pivotal mounting relationship thereby.

10. A hydraulic, power-transfer system for use in driving a conveyor for use with a material-spreading apparatus having a source of material to be spread, with said conveyor being disposed beneath said material for conveying same for spreading, said hydraulic, power-transfer system comprising two hydraulic cylinders and spool valve means, said hydraulic cylinders being double-acting, said hydraulic cylinders being 90° out of phase with each other, each of said hydraulic cylinders having a piston, and wherein and whereby drive is imparted by push or pull of said pistons, said hydraulic cylinders communicating with said valve means, means operatively connecting said hydraulic cylinders and valve means to actuate said valve means, said valve means controlling and directing a source of hydraulic fluid under pressure to said hydraulic cylinders to drive same and means operatively connecting said hydraulic cylinders with said conveyor to drive same.

11. A hydraulic, power-transfer system in accordance with claim 10, wherein each hydraulic cylinder has two drive strokes per cycle with each drive stroke occupying approximately 160°, with positive drive throughout the cycle thereby resulting.

12. A hydraulic, power-transfer system in accordance with claim 10, wherein each of said hydraulic cylinders has a piston rod, wherein said means operatively connecting said hydraulic cylinders with said conveyor to drive same comprise two stub shafts, two cranks and a conveyor drive shaft, wherein said stub shafts freely carry said piston rods, wherein said cranks fixedly carry said stub shafts and conveyor drive shaft.

13. A hydraulic, power-transfer system in accordance with claim 10, wherein said valve means comprise two four-way valves each comprising a valve housing and reciprocable valve spool therein.

14. A hydraulic, power-transfer system in accordance with claim 10, wherein said valve means comprise two valves each comprising a valve housing and reciprocable valve spool therein, wherein each of said valve housings carries a shock-absorbing housing, wherein one end of said valve spool extends into said shock-absorbing housing and carries resilient means, wherein said shock-absorbing housing carries another resilient means, wherein said valve-spool extension carries an end plate, and wherein in the reciprocation of said valve spool said resilient means function as shock absorbers and limit stops upon abutment of said end plate with said resilient means.

15. A hydraulic, power-transfer system in accordance with claim 10, wherein said valve means comprise two valves each comprising a valve housing and reciprocable valve spool therein, wherein each of said hydraulic cylinders has a piston rod, wherein said means operatively connecting said hydraulic cylinders and valve means to actuate said valve means comprise two stub shafts, two valve-rod cranks, two transverse pivot pins, two valve rods and two snap-action devices, wherein said stub shafts freely carry said piston rods, wherein said stub shafts fixedly carry said valve-rod cranks, wherein said valve-rod cranks fixedly carry said transverse pivot pins, wherein said transverse pivot pins freely carry said valve rods and wherein said valve rods and valve spools carry therebetween said snap-action devices.

16. A hydraulic, power-transfer system in accordance with claim 10, wherein said valve means comprise two valves each comprising a valve housing and reciprocable valve spool therein, wherein said means operatively connecting said hydraulic cylinders and valve means to actuate said valve means comprise two valve rods and two snap-action devices, wherein each valve rod and each valve spool operatively carry therebetween one of said snap-action devices, and wherein said snap-action device has means to reciprocate and slam said valve spool in a direction of travel opposite to the direction of travel of said valve rod connected to said snap-action device.

17. A hydraulic, power-transfer system in accordance with claim 16, wherein each valve spool has a reduced-end portion extending beyond its valve housing, wherein each snap-action device comprises a bifurcated mounting plate, two spring-mount guides each having two transverse pins fixed thereto, two spring mounts, two springs, two clevises and a cross pin, wherein said mounting plate has aligned holes pivotally receiving said transverse pins for trunnion-mounting of said spring-mount guides, wherein said spring-mount guides freely receive said spring mounts, wherein said spring mounts carry said springs, wherein said spring mounts fixedly carry said clevises, and wherein said clevises and reduced-end portion of said valve spool have aligned holes freely receiving said cross pin to afford pivotal mounting relationship thereby.

18. A hydraulic, power-transfer system in accordance with claim 10, wherein each of said hydraulic cylinders has a piston rod, wherein each hydraulic cylinder has two drive strokes per cycle with each drive stroke occupying approximately 160°; wherein said means operatively connecting said hydraulic cylinders with said conveyor to drive same comprise two stub shafts, two cranks and a conveyor drive shaft, wherein said stub shafts freely carry said piston rods, wherein said cranks fixedly carry said stub shafts and conveyor drive shaft; wherein said valve means comprise two four-way valves each comprising a valve housing and reciprocable valve spool therein, wherein each of said valve housings carries a shock-absorbing housing, wherein one end of said valve spool extends into said shock-absorbing housing and carries resilient means, wherein said shock-absorbing housing carries another resilient means, wherein said valve-spool extension carries and end plate, and wherein in the reciprocation of said valve spool said resilient means function as shock absorbers and limit stops upon abutment of said end plate with said resilient means; wherein said means operatively connecting said hydraulic cylinders and valve means to actuate said valve means comprise two valve-rod cranks, two transverse pivot pins, two valve rods and two snap-action devices, wherein said stub shafts fixedly carry said valve-rod cranks, wherein said valve-rod cranks fixedly carry said transverse pivot pins, wherein said transverse pivot pins freely carry said valve rods, wherein each of said valve rods and each of said valve spools operatively carry therebetween one of said snap-action devices, and wherein each of said snap-action devices has means to reciprocate and slam said valve spool in a direction of travel opposite to the direction of travel of said valve rod connected to said snap-action device; and wherein each valve spool has a reduced-end portion extending beyond its valve housing, wherein said means of said snap-action device to reciprocate and slam said valve spool in a direction of travel opposite to the direction of travel of said valve rod connected to said snap-action device comprises a bifurcated mounting plate, two spring-mount guides each having two transverse pins fixed thereto, two spring mounts, two springs, two clevises and a cross pin, wherein said mounting plate has aligned holes pivotally receiving said transverse pins of said spring-mount guides for trunnion-mounting of said spring-mount guides, wherein said spring-mount guides freely receive said spring mounts, wherein said spring mounts carry said springs, wherein said spring mounts freely carry said clevises, and wherein said clevises and reduced-end portion of said valve spool have aligned holes freely receiving said cross pin to afford pivotal mounting relationship thereby.

* * * * *